(No Model.) 2 Sheets—Sheet 1.
S. E. HASCALL.
MACHINE FOR GRANULATING TOBACCO STEMS.
No. 357,317. Patented Feb. 8, 1887.
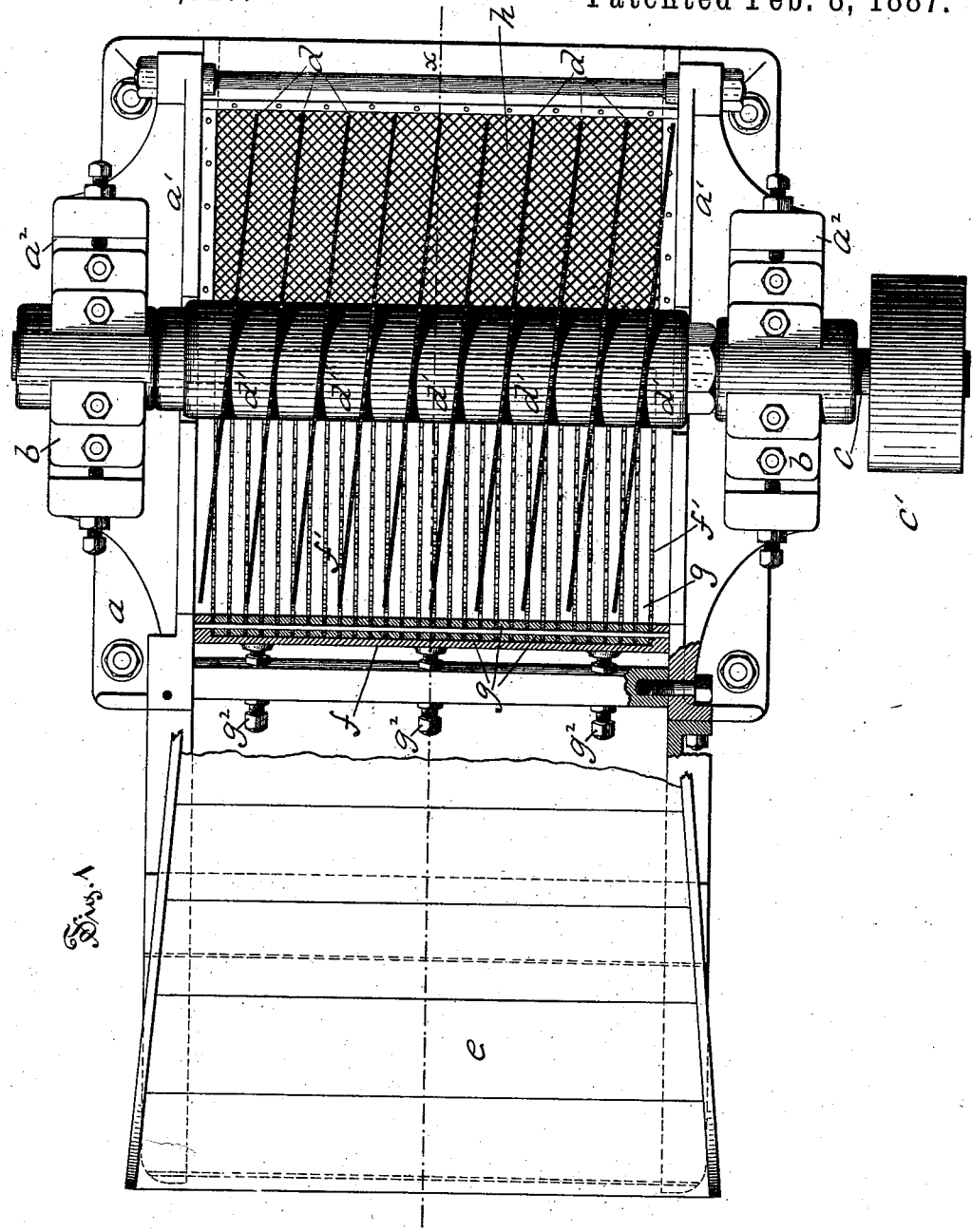

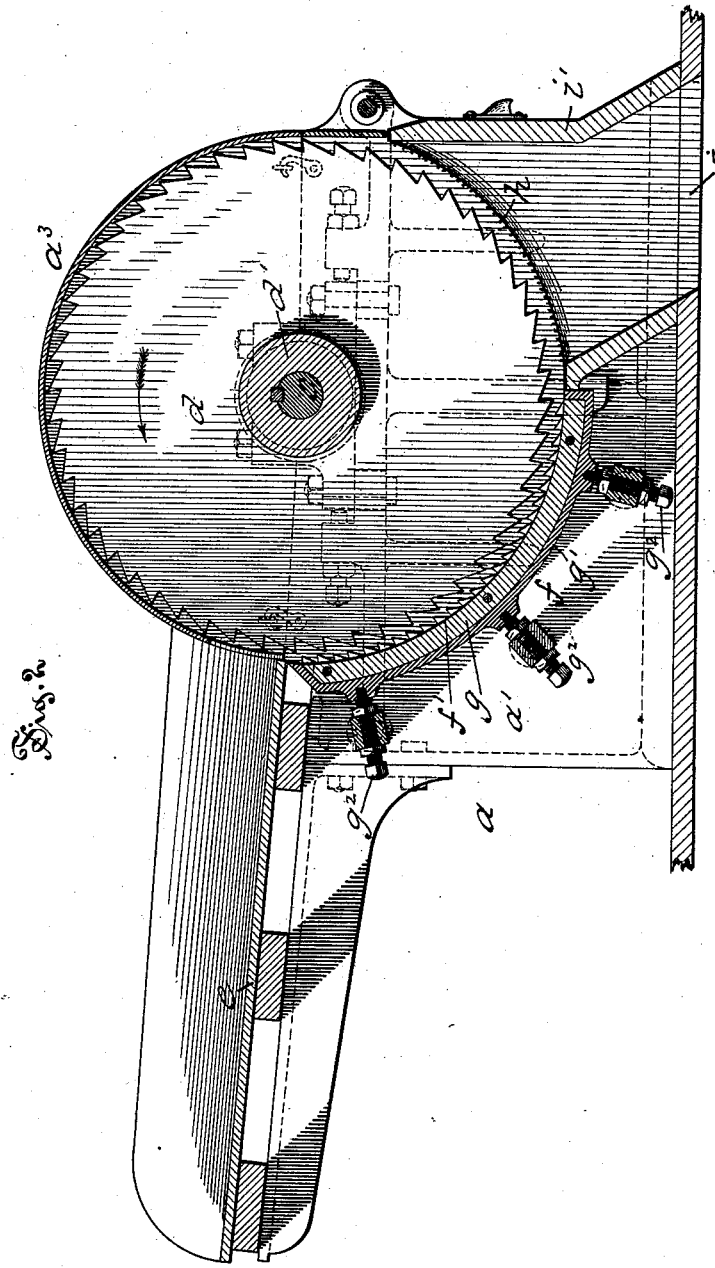

UNITED STATES PATENT OFFICE.

SAMUEL E. HASCALL, OF ENFIELD, CONNECTICUT.

MACHINE FOR GRANULATING TOBACCO-STEMS.

SPECIFICATION forming part of Letters Patent No. 357,317, dated February 8, 1887.

Application filed April 29, 1886. Serial No. 200,541. (No model.)

*To all whom it may concern:*

Be it known that I, SAMUEL E. HASCALL, of Enfield, in the county of Hartford and State of Connecticut, have invented certain new and useful Improvements in Machines for Grinding Tobacco-Stems, of which the following is a full, clear, and exact description, whereby any one skilled in the art can make and use the same.

The object of my invention is to provide a machine by means of which tobacco-stems may be reduced to a granulated or powdered condition for use as a fertilizer; and to this end my improvement consists in a cylindrical holder, mounted in which is a rotary shaft bearing a gang or series of circular saws set parallel to each other and at an angle to the axis of rotation of the shaft with the group of parallel concave saws secured in the holder at an angle with the plane of the circular saws, and the wire screen placed in the body of the holder.

It further consists in the combination of the rotary shaft bearing the oblique saws and a group of segmental saws secured in the holder at an angle with the path of movement of the saws, and in details of the construction and combination of the several parts, as more particularly hereinafter described, and pointed out in the claims.

In my improved machine I make use of a screen made up of strips or wires woven to form meshes of the desired size, such a structure presenting roughened surfaces that retard in a marked degree the movement of tobacco-stems across them and aid in subjecting them to the cutting action of the saws, and this even when such stems have been more or less finely granulated by their being subjected to the action of the gang of saws and complementary cutters before they reach the screen.

A further point of improvement in my within-described machine over those devices shown in prior patents consists in the combination of the rotary shaft with the parallel and angularly-placed saws, with the complementary saws that are held in the holder opposed to the rotary saws at an angle with the plane of the moving saws, the effect of this construction being a greatly increased efficiency. The effect of this combination of the saws and complementary cutters set in planes at an angle with each other gives a shearing cut across the saws, as well as in a line with the teeth, and this is of especial value in reducing the stems to an extremely fine powder. The machine is not only capable of granulating but also of powdering the material passed through it—a result not possible in prior machines of this class.

Referring to the drawings, Figure 1 is a plan view of a machine embodying my improvements, parts of the machine being cut away to show construction. Fig. 2 is a view in vertical central section of the machine on plane denoted by the line *x x* of Fig. 1.

In the accompanying drawings, the letter $a$ denotes a frame of any convenient material, as iron cast to shape, with legs or standards $a'$ and the vertical standards $a^2$, on which the adjustable bearings $b$ are supported. A rotary shaft, $c$, is supported in these bearings, and is provided with a pulley, $c'$, by means of which it may be driven from any suitable source of power. Fast to the shaft is a group or series of circular saws, $d$, that are secured to the shaft in a plane at an angle with the shaft, and they are held at a certain distance apart by means of the washers $d'$, or like devices, placed between the several saws. The object of this arrangement of the saws is to give to the teeth a lateral movement as the shaft is rotated, and the effect of this lateral motion in cutting is that a wide swath is cut by each saw, the saws being so arranged that the edges of these grooves or path of the teeth meet or slightly overlap.

The shaft $c$ is supported so that at least the lower half of the saws run in a box or holder whose wall is near and substantially parallel to the cylinder described by the extreme points of the teeth in the rotation of the shaft. The shaft and its appurtenant saws are preferably wholly inclosed within the box, the cover $a^3$ being held upon the frame by any convenient means, as hooks or the like, an opening being made through it on a plane about opposite the axis of the shaft. Adjacent to this opening a sloping table, $e$, is secured to the frame to support the mass of stems as they are fed into the machine.

It is essential to the operation of my machine that the inner face of the holder should be roughened or serrated, and I prefer to use the complementary cutter $f$, which consists of a series of saws, $f'$, with teeth cut in the concave edge of a segment or section of a ring and on a curve corresponding to the curve of the saws $d$. These saws $f$ are preferably arranged in planes at right angles to the axis of the shaft $c$, and are separated by blocks $g$, the whole being held in a frame, $g'$, that is adjustable toward and from the shaft $c$ by means of the adjusting-screws $g^2$, that pass through the threaded sockets in the frame, and are held in the desired position by lock-nuts in the usual manner. This arrangement of the sectional saws, with concave cutting-edges at right angles to the axis of the shaft $c$, places them at an angle with the plane of rotation of the saws that are fast to said shaft, and this arrangement not only adds greatly to the cutting effect, but also enables foreign substances—such as nails—that are apt to get mixed with the stems of tobacco to pass readily through to the screen below these sectional cutters. The upper surfaces of these blocks $g$ are so arranged as to lie in a plane at or near the base of the teeth of the saws $f'$ and thus limit the space through which the comminuted stems pass to the screen or sifter $h$, that is preferably made removable, so that the holder may be cleaned. As shown in the drawings, it forms the top or cover of a drawer, $i'$, that forms a part of the outlet-flue $i$ of the machine. The complementary cutter is preferably formed of a greater number of saws than of those held on the shaft, and the teeth of the former are finer.

In the absence of the complementary cutter I get a good result from the operation of the machine, owing to the retarding effect of the rough meshes of the screen or sifter, and the fineness of the product is graduated by changing the sifter.

I am aware that it is not new to use in a device for cutting straw and reducing wood to a fibrous condition a gang of saws fixed in a plane at an angle to the rotary shaft to which they are fastened, and such a device I do not broadly claim.

I am also aware that it is not new to use a gang of rotary saws upon a shaft that are opposed by complementary cutters; and, further, that cutting or granulating machines embodying rotary cutters opposed by segmental cutters arranged in a box provided with a perforated screen are not new, and such above-described devices I do not broadly claim.

I claim as my invention—

1. In combination with a plural number of parallel saws secured to a rotary shaft at intervals and at an angle with its axis, a complementary cutter formed of a series of concave saws arranged in a plane at an angle with the plane of the rotary saws, all substantially as described.

2. In combination with a rotary shaft bearing a saw secured at an angle with its axis, the concave holder and a complementary cutter composed of a plural number of parallel saws, each with a concave cutting-edge and held in a plane at an angle with the plane of the rotary saws, all substantially as described.

3. In a machine of the within-described class, a supporting-frame, $a$, a rotary shaft, $c$, mounted in the frame and bearing a plural number of saws, $d$, secured at an angle with its axis and parallel to each other, the separating washers $d'$, the complementary cutter $f$, consisting of a series of saws with teeth cut in their concave edge, the set of complementary saws being fixed within the latter at an angle with the plane of the rotary saws, the cover $q^3$, with an inlet-opening adjacent to the table $e$, the table $e$, for supporting the material fed to the saws, and the drawer $i'$, forming a part of the outlet-flue $i^2$ and supporting the roughened and perforated screen $h$, the parts being combined substantially as described.

SAMUEL E. HASCALL.

Witnesses:
CHAS. L. BURDETT,
H. R. WILLIAMS.